US010536477B1

(12) United States Patent
Trimberger (10) Patent No.: US 10,536,477 B1
(45) Date of Patent: Jan. 14, 2020

(54) PROTECTION AGAINST ATTACKS FROM REMOTE NETWORK DEVICES

(71) Applicant: Xilinx, Inc., San Jose, CA (US)

(72) Inventor: Stephen M. Trimberger, Incline Village, NV (US)

(73) Assignee: XILINX, INC., San Jose, CA (US)

( * ) Notice: Subject to any disclaimer, the term of this patent is extended or adjusted under 35 U.S.C. 154(b) by 227 days.

(21) Appl. No.: 15/343,539

(22) Filed: Nov. 4, 2016

(51) Int. Cl.
  *H04L 29/06* (2006.01)

(52) U.S. Cl.
  CPC ...... *H04L 63/1441* (2013.01); *H04L 63/0428* (2013.01); *H04L 63/0442* (2013.01); *H04L 63/108* (2013.01); *H04L 63/1408* (2013.01)

(58) Field of Classification Search
  CPC ............. H04L 63/0428; H04L 63/0442; H04L 63/108; H04L 63/1408; H04L 63/08; H04L 63/10; H04L 63/1441–1491; H04L 67/143–145; G06F 2221/2137
  See application file for complete search history.

(56) References Cited

U.S. PATENT DOCUMENTS

| | | | |
|---|---|---|---|
| 6,832,255 B1* | 12/2004 | Rumsewicz | H04L 29/06 709/224 |
| 7,382,787 B1 | 6/2008 | Barnes et al. | |
| 7,711,852 B1 | 5/2010 | Troan et al. | |
| 7,852,852 B2 | 12/2010 | Lynch et al. | |
| 8,082,581 B2* | 12/2011 | Wu | H04L 63/102 713/151 |
| 8,255,393 B1* | 8/2012 | Yu | H04L 63/1441 707/724 |
| 9,954,833 B2* | 4/2018 | Chen | H04L 63/061 |
| 2013/0347073 A1* | 12/2013 | Bryksa | H04L 63/105 726/4 |
| 2016/0308978 A1* | 10/2016 | Pi | H04L 12/40 |
| 2017/0063798 A1* | 3/2017 | Lapidous | H04L 63/0281 |

* cited by examiner

*Primary Examiner* — Kevin Bechtel
(74) *Attorney, Agent, or Firm* — LeRoy D. Maunu (57) ABSTRACT

Disclosed approaches for protecting against attacks on a local network device include establishing an access period associated with one remote network device of a plurality of remote network devices. The router rejects messages from remote network devices of the plurality of remote network devices not having associated access periods. The router forwards to the local network device, a message received from the one remote network device during the access period. The router rejects, in response to expiration of the access period, subsequent messages from the one remote network device to the local network device.

18 Claims, 5 Drawing Sheets

PROTECTION AGAINST ATTACKS FROM REMOTE NETWORK DEVICES

TECHNICAL FIELD

The disclosure generally relates to protecting local network devices against attacks from remote network devices.

BACKGROUND

As society increasingly depends on electronic devices, the information accessible through these devices is becoming increasingly lucrative to attackers. Many people have multiple devices, such as smart phones, tablet computers, notebook computers, desktop computers, and network attached storage systems. Information on financial accounts, medical records, emails, business documents may be stored on or accessible through one or more of a user's devices. Whereas the goal of many attacks in the past has been simply to render a device inoperable, the importance of the information accessible on users' devices and the number of devices having access to that information has led to more sophisticated attacks that range from encrypting data on a device and holding the device hostage, to extracting valuable data from a user's device to the attackers equipment.

Firewalls, access controls, intrusion detection encryption are but some of the measures employed to protect against unauthorized access to a network device. Even with protection that is generally recognized as adequate, skilled attackers may break through protection mechanisms, or exploit vulnerabilities and gain access to a network device. As the level of connectedness increases with proliferation of the Internet of Things (IoT), protecting against unauthorized access to a network device will continue to increase in importance.

SUMMARY

A disclosed method of protecting against attacks on a local network device includes establishing an access period associated with one remote network device of a plurality of remote network devices. The router rejects messages from remote network devices of the plurality of remote network devices not having associated access periods. The router forwards to the local network device a message received from the one remote network device during the access period. The router rejects, in response to expiration of the access period, subsequent messages from the one remote network device to the local network device.

A disclosed routing circuit includes network interface circuitry, a processor, and a memory. The network interface circuitry is configured and arranged to send messages to and receive messages from a plurality of remote network devices over a first set of one or more communication channels, and to send messages to and receive messages from a local network device over a second set of one or more communication channels. The processor is coupled to the network interface circuitry and to the memory. The memory is configured with instructions that when executed by the processor cause the processor to establish an access period associated with one remote network device of the plurality of remote network devices. The instructions further cause the processor to reject messages from remote network devices of the plurality of remote network devices not having associated access periods. The instructions further cause the processor to forward to the local network device, a message received from the one remote network device during the access period. The instructions further cause the processor to reject, in response to expiration of the access period, subsequent messages from the one remote network device to the local network device.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The Internet has made communication over vast distances fast and ubiquitous, which has been a boon for many applications. However, widespread connectivity has exposed network devices to attackers who may be located anywhere in the world. Most attacks are likely to be initiated from remote network devices. For example, a collection of network devices may be inter-coupled by a local area network (LAN), and the LAN coupled to the Internet via a local router and other supporting infrastructure. Most attacks on network devices on the LAN are expected to be initiated not from local network devices, but from network devices on the Internet (remote network devices).

In an effort to reduce susceptibility of local network devices to attacks from remote network devices, a router in the disclosed approaches generally disables by default, all incoming messages from all remote network devices to local network devices. The router allows outgoing messages from the local network devices to remote network devices. A router establishes an access period for a remote network device using one or more of various approaches. In one approach, the router can be configured to set respective access periods for particular remote network devices at particular times. In another approach, a message received at the router can identify a remote network device and the remote network device can establish an access period for the indicated remote network device. Once an access period is established, the router temporarily enables subsequent incoming messages from the registered address. The local network device has thereby limited from which remote network device the router will permit incoming messages to the LAN. The router can impose a limit on the duration for which the messages from the remote network device will be allowed on the LAN by establishing an access period associated with the remote network device. Once the access period has expired, the router rejects subsequent incoming messages from the remote network device. The disclosed approaches allow an unattended LAN to ignore incoming messages and effectively defeat attacks by port scanners and other traffic.

Figure 1:
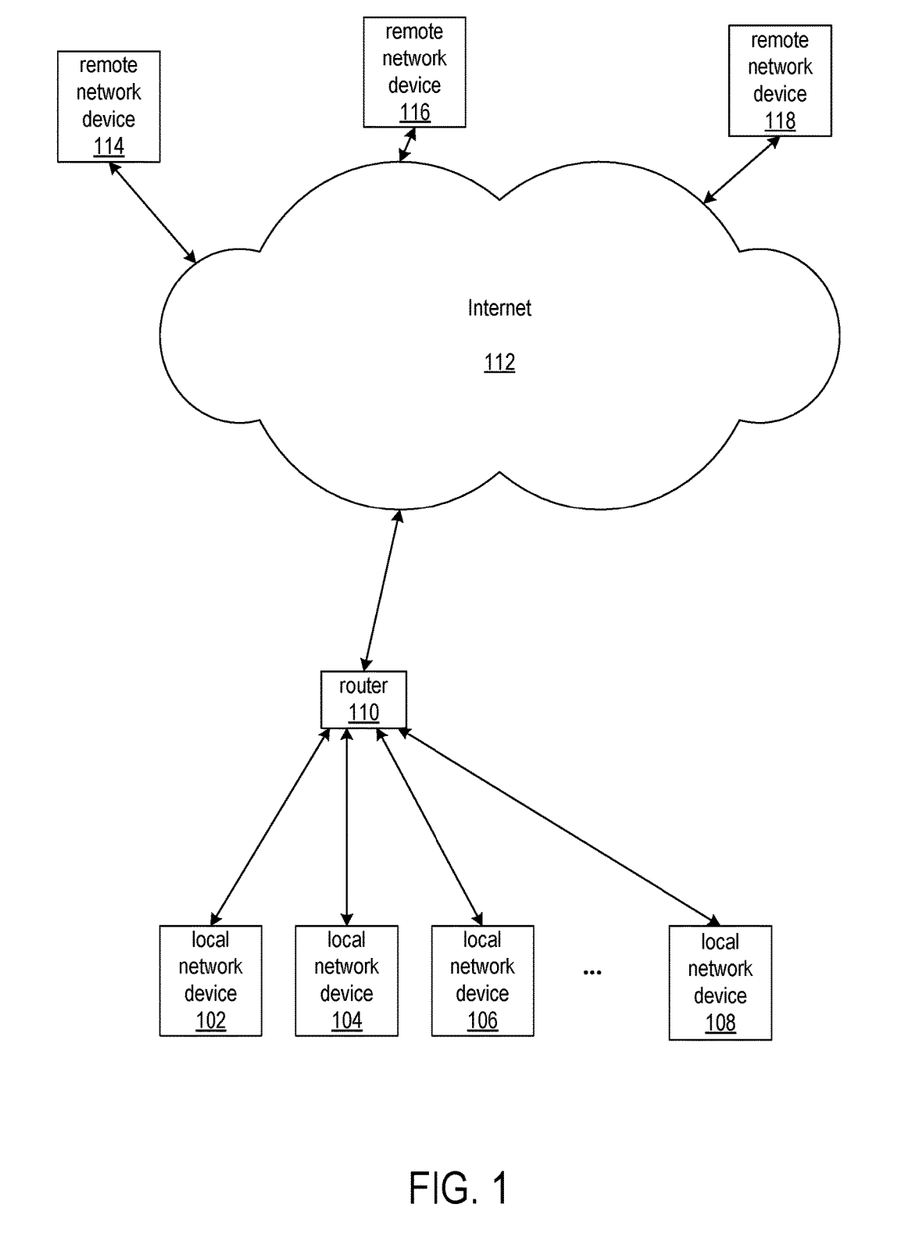
FIG. 1 shows local network devices that are coupled to a wider network, such as the Internet, via local router.

FIG. 1 shows local network devices that are coupled to a wider network, such as the Internet, via local router. The local network devices 102, 104, 106, . . . 108 can include desktop computers, notebook computers, tablets, smartphones, and servers, as well as industrial equipment and household appliances that that can be categorized under the umbrella term, Internet of Things (IoT). The local network devices may have wired or wireless connections to the router 110.

The router 110 generally forwards packets (or "messages") from the one computer network to another computer network. In an exemplary application, the router forwards messages between a LAN, which connects the local network devices and the Internet 112. Routers range in capabilities from connecting a home network to the Internet through an Internet service provider to routers that connect large businesses or ISP networks to core routers along the backbone of the Internet. Routers can be implemented as hardware-based or software-based devices. Routers can include security functions, eliminating some packets or preventing undesirable communications.

Remote network devices, such as network devices 114, 116, and 118, can connect to the Internet through respective LANs and routers (not shown). A remote network device can initiate contact to a local network device under a variety of different protocols. Example protocols include the Internet Protocol (IP), Transmission Control Protocol (TCP), Hyper Text Transfer Protocol (HTTP), File Transfer Protocol (FTP), User Datagram Protocol (UDP), Internet Control Message Protocol (ICMP), Simple Mail Transport Protocol (SMTP), Simple Network Management Protocol (SNMP), and Telnet. Most of the protocols include request messages and acknowledge messages sent between the communicating devices, and the messages specify a source address of the sending device and a destination of the intended receiving device.

The disclosed methods and systems generally limit access by the remote network devices to a local network device by way of the router rejecting by default all messages, with limited exception, from remote network devices to the local network device, until an access period has been established for the remote network device. Once an access period has been established for a remote network device, the router allows incoming messages from that remote network device. Messages from other remote network devices to the local network device are also rejected until access periods are established for those other remote network devices.

The access period can be set in a number of different ways. In one approach, the access period can be set by configuring the router to set the access period for particular remote network device for a particular time period. For example, the router can establish a regularly occurring access period, such as a certain time period every day, for a remote network device. In another approach, the router can establish the access period in response to the outgoing message. The router can start a delay timer and the access period can commence upon expiration of the delay timer. Alternatively, the router can set the access period to start at a predetermined clock time or at an offset from the current time. In another approach, the outgoing message can specify the access period. In yet another approach, a message from a trusted party can vouch for the legitimacy of a remote network device, and the access period for that remote network device can be set using any of the aforementioned approaches.

Figure 2:
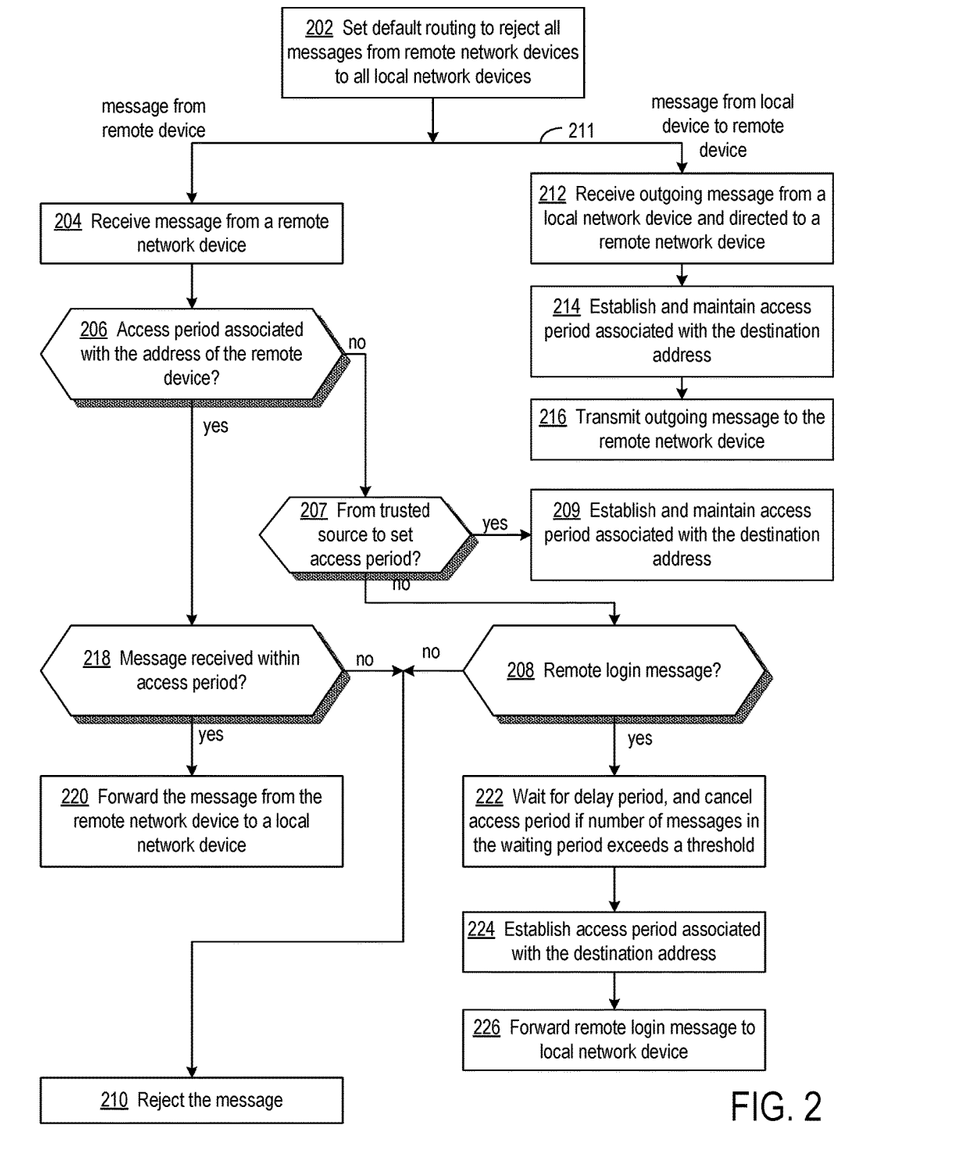
FIG. 2 shows a flowchart of a process of protecting against attacks against local network devices from remote network devices.

FIG. 2 shows a flowchart of a process of protecting against attacks on local network devices from remote network devices. The process of FIG. 2 can be performed by a router in an exemplary implementation. At block 202, the router initially sets a default routing policy to reject all incoming messages to the local network devices, with the exception of remote login messages, which are handled different from the manner in which other types of messages are handled.

The router receives an incoming message at block 204. At decision block 206, the router determines whether or not an access period is associated with the addressed remote network device. If no access period has yet been associated with the remote network device, the process continues at decision block 207, which determines whether or not the message is from a trusted source for purpose of establishing an access period for a remote network device. If the message is from a trusted source for establishing an access period, at block 209, the router establishes an access period associated with a remote network device identified by the message from the trusted source. Known authentication approaches can be used to verify that the sender is a trusted source.

In establishing the access period, the router can start a delay timer and the access period can commence upon expiration of the delay timer. Alternatively, the router can set the access period to start at a predetermined clock time or an offset from the current time. In another approach, the message from the trusted source can specify the access period.

The access period is a period of time during which messages from a remote network device will be forwarded to the local network device that sent the message. An incoming message would not be forwarded to a local network device unless and until an access period has been established for the remote network device. In establishing and maintaining the access period associated with a remote network device, in one implementation the router stores an identifier, such as the address of the remote network device, in router memory and starts a timer associated with the address. When the access period has expired, the router can remove the address of the remote network device from the memory or otherwise flag in the memory that the access period is expired for the remote network device.

The trusted source for establishing an access period can be either a local network device or a remote network device. Therefore, although the process of FIG. 2 shows the message from a trusted source as being from a remote network device, process steps similar to blocks 207 and 209 can be implemented on the path 211.

If the message is not from a trusted source for establishing an access period, the process continues at decision block 208, which determines whether or not the incoming message is a remote login message. A login message can be any message that initiates communication. If the message is not a remote login message, at block 210 the router rejects the incoming message. In one implementation, rejecting the incoming message may entail ignoring the message and taking no further action. In another implementation, the router can send a rejection message to the remote network device. In either implementation, the incoming message is not transmitted to the addressed local network device.

At block 212, the router receives an outgoing message addressed to a remote network device from a local network device. At block 214, the router establishes and maintains an access period associated with the remote network device if an access period has not already been established. In one implementation, incoming network messages would be forwarded during the access period to only the local network device that sent the message. An incoming message would not be forwarded to a local network device unless and until that local network device had first sent a message to the remote network device. In another implementation, once one local network device sends a message to a remote network device, the router may forward messages from the remote network device to any local network device on the LAN.

In establishing the access period, the router can start a delay timer and the access period can commence upon expiration of the delay timer. Alternatively, the router can set the access period to start at a predetermined clock time or an offset from the current time. In another approach, the message from the local network device can specify the access period. In one implementation the router stores an identifier, such as the address of the remote network device, in router memory and starts a timer associated with the address. When the access period has expired, the router can remove the address of the remote network device from the memory or otherwise flag in the memory that the access period is expired for the remote network device. In some implementations, an access period is associated with each pair of a local network device and a remote network device to which the local network device has sent a message.

At block 216, the router transmits the outgoing message to the addressed remote network device.

Once an access period has been established for a remote network device and the router receives a message from that remote network device at block 204, the router proceeds from decision block 206 to decision block 218. At decision block 218, the router determines whether or not the message was received within the access period for the remote network device. If the access period has not expired, the router forwards the message to the local network device at block 220. If the access period has expired, the router rejects the message at block 210 as described above. After an access period has expired, the router can establish a new access period in response to the local network device sending another message to the remote network device.

For some protocols and applications, unsolicited contact from a remote network device to a local network device may be desirable. For example, a remote network device may send a message to a local network device for initiating remote login before the local network device has sent a message to the remote network device. To obstruct an attacker attempting remote login, the router imposes a delay on forwarding the remote login message to the local network device.

At decision block 208, the router determines whether or not the message from the remote network device is a remote login message. The content of the message indicates whether or not a message is a remote login message. If the message is a remote login message, at block 222 the router waits for a delay period. For example, the router can wait for five minutes before sending the remote login message to the local network device. The delay may dissuade an attacker from continuing attempts to access the local network device. If during the delay period, the remote network device sends additional messages attempting remote login, the router can cancel establishing the access period (not perform the processing of blocks 224 and 226) if the number of additional messages exceeds an application-specific threshold. After waiting for the delay period, the router at block 224 establishes an access period, such as one minute window, allowing the remote network device to complete the remote login protocol. The durations of the delay period and access period are exemplary and can vary according to application and security requirements. At block 226, the router forwards the remote login message to the local network device.

Figure 3:
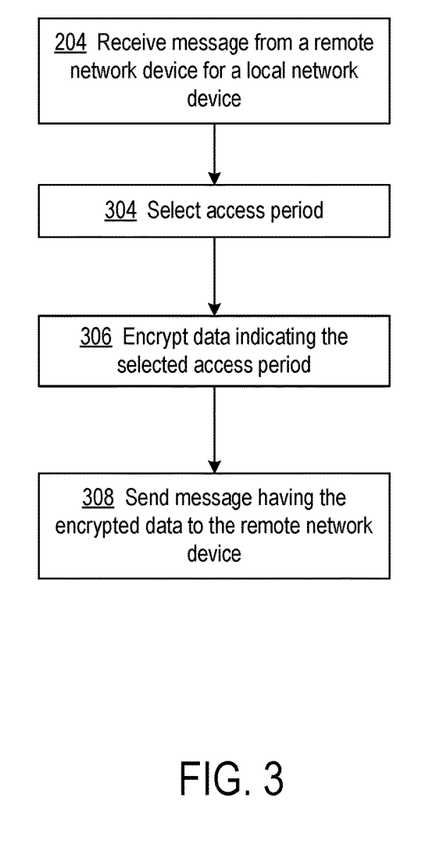
FIG. 3 shows a process for further frustrating attacks on local network devices by remote network devices.

FIG. 3 shows a process for further frustrating attacks on local network devices by remote network devices. In response to an incoming message, the router may reply to an incoming message with a message that encrypts an indication of a time period during which the router will forward an incoming message from the remote network device to the local network device.

At block 204, the router receives from a remote network device an incoming message addressed to a local network device. At block 304, the router selects an access period. In one implementation, the access period can commence immediately. In other implementations, the access period can be selected to commence at random times. At block 306, the data that specifies the access period is encrypted so that in order for the remote network device to communicate with the local network device, the remote network device must be able to decrypt the access period data and send a message within the designated access period. The access period data can be encrypted using a public-private key pair or a symmetric key depending on application and security requirements. At block 308, the router sends the message having the encrypted access period data to the remote network device.

Figure 4:
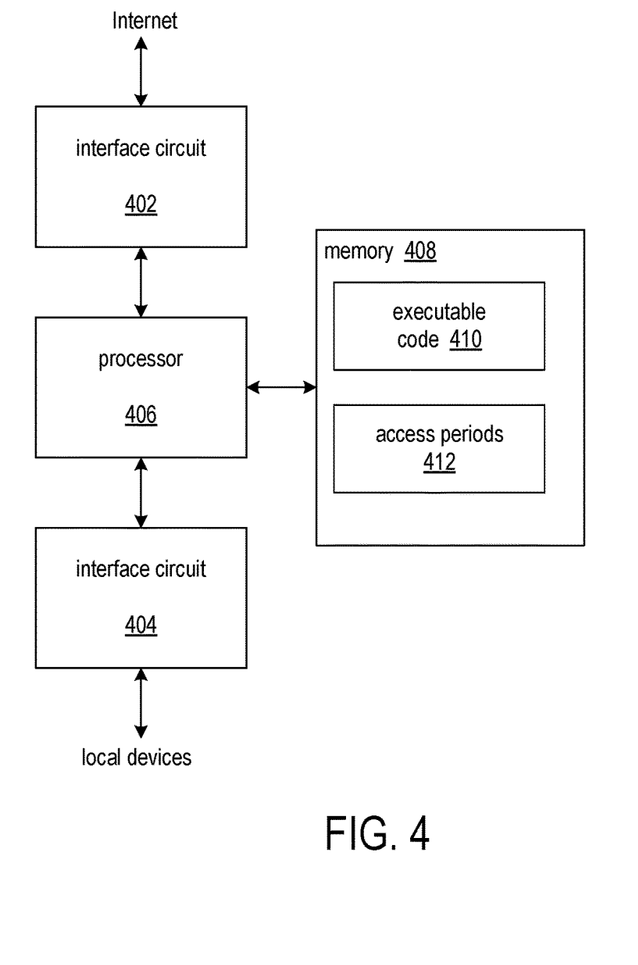
FIG. 4 shows an example of a circuit arrangement for protecting against attacks on local network devices from remote network devices.

FIG. 4 shows an example of a circuit arrangement for protecting against attacks on local network devices from remote network devices. The circuit arrangement generally includes network interface circuitry 402 and 404, processor 406, and memory 408. Interface circuit 402 is coupled to the processor for sending messages to and receiving messages from remote network devices such as devices connected to the Internet through one or more communication channels. Interface circuit 404 is also coupled to the processor. Interface circuit 404 sends messages to and receives messages from local network devices over one or more communication channels, such as those found in a LAN.

The memory 408 is configured with executable program code 410. In executing the code 410, the processor limits access to the local network devices from remote network devices. In executing the code, the processor initially sets a default routing policy to reject all incoming messages to the local network devices, with the exception of remote login messages.

When the processor receives an incoming message from a remote network device via the interface circuit 402, the processor determines whether or not an access period is associated with the addressed remote network device. If no access period has yet been associated with the remote network device, the processor determines whether or not the message is from a trusted source for purpose of establishing an access period for a remote network device. If the message is from a trusted source for establishing an access period, the processor establishes an access period associated with a remote network device as described above.

If the message is not from a trusted source for establishing an access period, the processor determines whether or not the incoming message is a remote login message. If the message is not a remote login message, the processor rejects the incoming message as described above. The processor can also cancel establishing the access period if the number of messages received during the delay period exceeds an application-specific threshold.

When the processor receives an outgoing message addressed to a remote network device via interface circuit 404 from a local network device, the processor establishes and maintains an access period associated with the remote network device if an access period has not already been established. The collection of access periods associated with different remote network devices is shown as block 412. The processor can store an identifier of the remote network device and starts a timer associated with the identifier. When the access period has expired, the processor can remove the address of the remote network device from the memory, or otherwise flag in the memory that the access period is expired for the remote network device. The processor provides interface circuit 402 with the outgoing message for transmission to the remote network device.

Once an access period has been established for a remote network device and the processor receives a message from that remote network device, the processor determines whether or not the message was received within the access period for the remote network device. If the access period has not expired, the processor forwards the message to the local network device. If the access period has expired, the processor rejects the message.

If the processor determines that an incoming message is a remote login message, the processor waits for a delay period. After waiting for the delay period, the processor establishes an access period, allowing the remote network device to complete the remote login protocol, and forwards the remote login message to the local network device.

In another aspect, the processor may reply to an incoming message with a message that encrypts an indication of a time period during which the router will forward an incoming message from the remote network device to the local network device.

When the processor receives an incoming message addressed to a local network device from a remote network device, the processor selects an access period, which can commence immediately or selected to commence at random times. The processor encrypts the data that specifies the access period and sends the message having the encrypted access period data to the remote network device.

Figure 5:
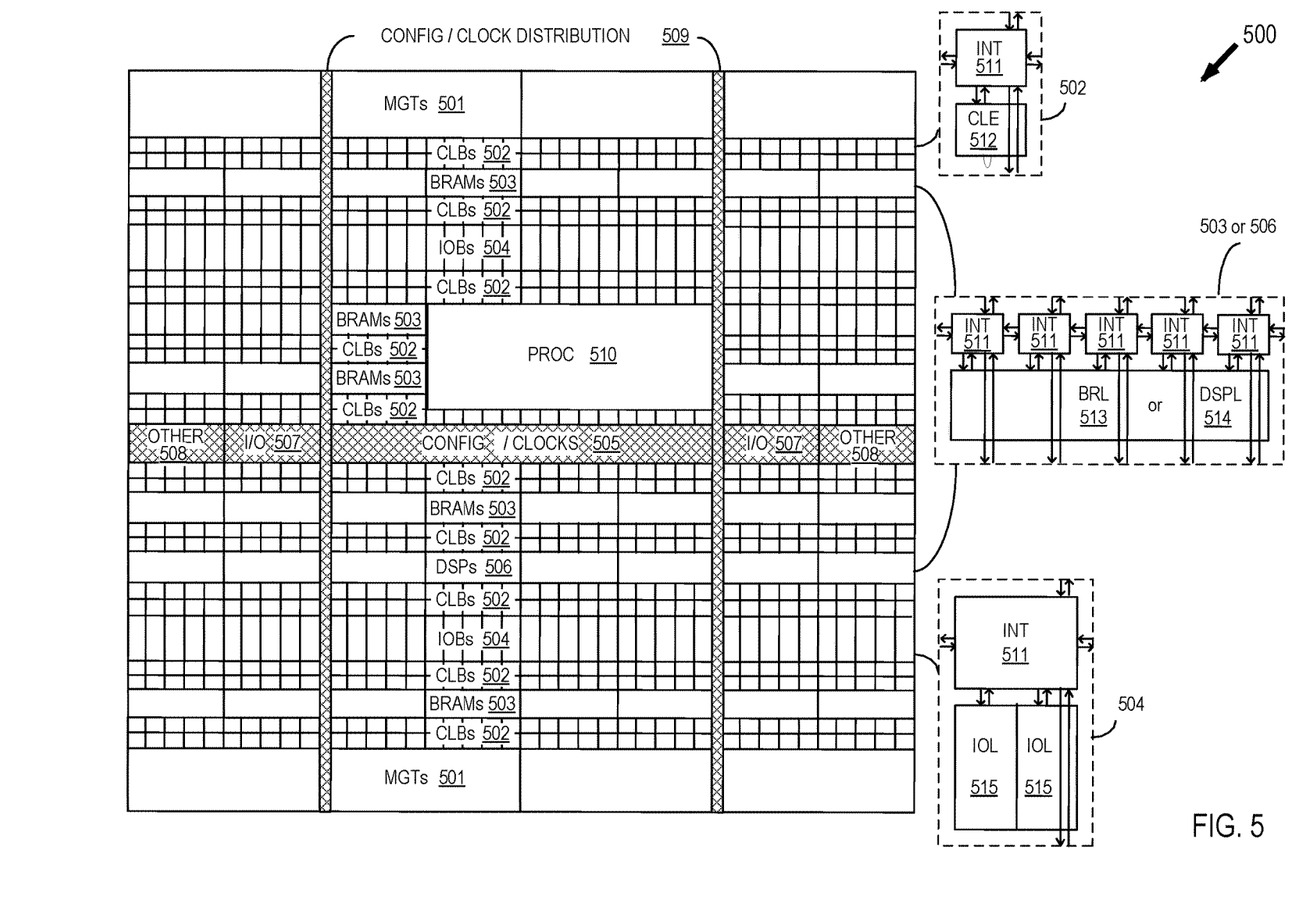
FIG. 5 shows a programmable integrated circuit (IC) on which the disclosed circuits and processes may be implemented.

FIG. 5 shows a programmable integrated circuit (IC) 500 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 5 illustrates programmable IC 500 that includes a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized input/output blocks (I/O) 507, for example, clock ports, and other programmable logic 508 such as digital clock managers, analog-to-digital converters, system monitoring logic, and so forth. Some programmable IC having FPGA logic also include dedicated processor blocks (PROC) 510, and internal and external reconfiguration ports (not shown).

In some FPGA logic, each programmable tile includes a programmable interconnect element (INT) 511 having standardized connections to and from a corresponding interconnect element in each adjacent tile. Therefore, the programmable interconnect elements taken together implement the programmable interconnect structure for the illustrated FPGA logic. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic, plus a single programmable interconnect element INT 511. A BRAM 503 can include a BRAM logic element (BRL) 513 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 506 can include a DSP logic element (DSPL) 514 in addition to an appropriate number of programmable interconnect elements. An IOB 504 can include, for example, two instances of an input/output logic element (IOL) 515 in addition to one instance of the programmable interconnect element INT 511. As will be clear to those of skill in the art, the actual I/O bond pads connected, for example, to the I/O logic element 515, are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 5 include additional logic blocks that disrupt the regular columnar structure making up a large part of the programmable IC. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for protecting against attacks from remote network devices. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method of protecting against attacks on a local network device, comprising:
   receiving messages addressed to the local network device from a plurality of remote network devices at a router;
   determining by the router whether a one message of the messages addressed to the local network device is a remote login message from one remote network device of the plurality of remote network devices;
   waiting for a delay period by the router in response to determining that the one message is a remote login message to the local network device;
   establishing, at the router in response to determining that the one message is a remote login in message, an access period associated with the one remote network device and having a predetermined duration that commences after the delay period;
   forwarding the remote login message to the local network device after waiting for the delay period;
   allowing by the router during the access period, the remote network device to complete a remote login protocol with the local network device;
   rejecting each message that is not a remote login message received from each remote network device of the plurality of remote network devices not having an associated access period;
   forwarding to the local network device, a message that is not a remote login message received from the one remote network device during the access period; and
   rejecting, in response to expiration of the access period associated with the one remote network device, subsequent messages that are not remote login messages from the one remote network device to the local network device.

2. The method of claim 1, wherein the establishing the access period includes establishing the access period associated with the one remote network device in response to an outgoing message to the one remote network device, the access period having a predetermined duration commencing with transmission of the outgoing message.

3. The method of claim 2, wherein the establishing the access period includes setting the access period to have a predetermined duration and to start at a time delayed from a time at which the outgoing message was received.

4. The method of claim 1, further comprising:
   determining that a sender of the message received at the router is a trusted source; and
   wherein the message received at the router identifies the one remote network device, and the establishing the access period includes associating the access period with the one remote network device identified by the message received at the router.

5. The method of claim 1, wherein the establishing the access period includes:
   generating, in response to a message to the local network device by the one remote network device, encrypted data that specify the access period; and
   transmitting the encrypted data to the one remote network device.

6. The method of claim 5, wherein the generating the encrypted data includes:
   generating a random start time for the access period having a predetermined duration that commences with the start time; and
   specifying the random start time in the data that specify the access period.

7. The method of claim 5, wherein the generating the encrypted data includes encrypting the data that specify the access period using a public key of a public-private key pair of the one remote network device.

8. The method of claim 1, wherein the forwarding the message to the local network device includes forwarding the message only during the access period.

9. The method of claim 1, wherein the establishing the access period includes storing in a memory, data indicative of a duration of the access period associated with the one remote network device.

10. A routing circuit, comprising:
    network interface circuitry configured and arranged to send messages to and receive messages from a plurality of remote network devices over a first set of one or more communication channels, and to send messages to and receive messages from a local network device over a second set of one or more communication channels;
    a processor coupled to the network interface circuitry;
    a memory coupled to the processor, wherein the memory is configured with instructions that when executed by the processor cause the processor to:
    receive messages addressed to the local network device from a plurality of remote network devices;
    determine whether a one message of the messages addressed to the local network device is a remote login message from one remote network device of the plurality of remote network devices;
    wait for a delay period in response to determining that the one message is a remote login message to the local network device;
    establish, in response to determining that the one message is a remote login in message, an access period associated with the one remote network device and having a predetermined duration that commences after the delay period;
    forward the remote login message to the local network device after waiting for the delay period;
    allow the remote network device to complete a remote login protocol with the local network device during the access period;
    reject each message that is not a remote login message received from each remote network device of the plurality of remote network devices not having an associated access period;
    forward to the local network device, a message that is not a remote login message received from the one remote network device during the access period; and
    reject, in response to expiration of the access period associated with the one remote network device, subsequent messages that are not remote login messages from the one remote network device to the local network device.

11. The routing circuit of claim 10, wherein the instructions that establish the access period include instructions for establishing the access period associated with the one remote network device in response to an outgoing message from the local network device to the one remote network device, the access period having a predetermined duration commencing with transmission of the outgoing message.

12. The routing circuit of claim 11, wherein the instructions for establishing the access period includes instructions for setting the access period to have a predetermined duration and to start at a time delayed from a time at which the outgoing message was received.

13. The routing circuit of claim 10, wherein the memory is configured with further instructions that when executed by the processor cause the processor to:

determine that a sender of the message received at the router is a trusted source; and wherein the message received at the router identifies the one remote network device, and the instructions for establishing the access period include instructions for associating the access period with the one remote network device identified by the message received at the router.

14. The routing circuit of claim 10, wherein the instructions that cause the processor to establish the access period include instructions that cause the processor to:

generate, in response to a message to the local network device by the one remote network device, encrypted data that specify the access period; and transmit the encrypted data to the one remote network device.

15. The routing circuit of claim 14, wherein the instructions that cause the processor to generate the encrypted data include instructions that cause the processor to:

generate a random start time for the access period having a predetermined duration that commences with the start time; and specify the random start time in the data that specify the access period.

16. The routing circuit of claim 14, wherein the instructions that cause the processor to generate the encrypted data include instructions that cause the processor to encrypt the data that specify the access period using a public key of a public-private key pair of the one remote network device.

17. The routing circuit of claim 10, wherein the instructions that cause the processor to allow the message to the local network device include instructions that cause the processor to allow the message only during the access period.

18. The routing circuit of claim 10, wherein the instructions for establishing the access period include instructions for storing data indicative of a duration of the access period associated with the one remote network device.

* * * * *